United States Patent
Hernandez Espina et al.

(10) Patent No.: US 9,751,640 B2
(45) Date of Patent: Sep. 5, 2017

(54) STOPPING SYSTEM FOR A CAB OF BOARDING BRIDGES FOR ACCESSING AIRCRAFT AND SHIPS

(71) Applicant: THYSSENKRUPP AIRPORT SYSTEMS, S.A., Mieres (Asturias) (ES)

(72) Inventors: Manuel Hernandez Espina, Mieres (ES); Julian Fernandez Diaz, Mieres (ES); Antonio Vazquez Hernandez, Mieres (ES); Antonio Murias Bermejo, Mieres (ES)

(73) Assignee: THYSSENKRUPP AIRPORT SYSTEMS, S.A., Mieres (Asturias) (ES)

( * ) Notice: Subject to any disclaimer, the term of this patent is extended or adjusted under 35 U.S.C. 154(b) by 569 days.

(21) Appl. No.: 14/270,764

(22) Filed: May 6, 2014

(65) Prior Publication Data
US 2014/0326546 A1 Nov. 6, 2014

(30) Foreign Application Priority Data
May 6, 2013 (ES) .................................. 201330655

(51) Int. Cl.
*B64F 1/305* (2006.01)
*B63B 27/14* (2006.01)
*E01D 15/24* (2006.01)

(52) U.S. Cl.
CPC .............. *B64F 1/305* (2013.01); *B63B 27/14* (2013.01); *B64F 1/3055* (2013.01); *E01D 15/24* (2013.01)

(58) Field of Classification Search
CPC ........ B64F 1/305; B64F 1/362; B64F 1/3055; B63B 27/14
USPC ........ 188/31, 67, 69, 156–164; 14/69.5–72.5
See application file for complete search history.

(56) References Cited

U.S. PATENT DOCUMENTS

| 4,961,241 A * | 10/1990 | Alexander | B65G 69/2811 |
| | | | 14/69.5 |
| 6,267,207 B1 * | 7/2001 | Fleischer | B60T 7/107 |
| | | | 188/106 P |
| 7,299,905 B2 * | 11/2007 | Yamaguchi | B60T 13/02 |
| | | | 188/156 |

(Continued)

FOREIGN PATENT DOCUMENTS

| CN | 201610222 U | 10/2010 |
| CN | 201777388 U | 3/2011 |

(Continued)

OTHER PUBLICATIONS

European Search Report, Patent No. 2801529, Dated Feb. 15, 2017.

*Primary Examiner* — Christopher Schwartz
(74) *Attorney, Agent, or Firm* — Notaro, Michalos & Zaccaria P.C.

(57) ABSTRACT

A stopping system for a cab of boarding bridges for accessing aircraft and ships, which boarding bridge comprise a round structure (1) to which the cab (2) is attached with rotational capabilities, having stopping means made up of a cab rotation blocking mechanism, formed by a linearly movable lance (12), and of a coupling part (11) for said lance, that is integral to and rotates with the cab (2). The movement of the lance is controlled by a sensor that detects the operations of the cab drive mechanism.

20 Claims, 4 Drawing Sheets

(56) References Cited

U.S. PATENT DOCUMENTS 7,677,367 B2 * 3/2010 Usui ................ F16D 65/18
                                                188/156
8,065,769 B2 * 11/2011 Krimpen ............ E01D 15/127
                                                14/2.4
9,434,482 B2 * 9/2016 Xiang ................ B64F 1/305

FOREIGN PATENT DOCUMENTS

| CN | 201777389 U | 3/2011 |
| KR | 1020090070599 A | 7/2009 |

* cited by examiner

STOPPING SYSTEM FOR A CAB OF BOARDING BRIDGES FOR ACCESSING AIRCRAFT AND SHIPS

CROSS-REFERENCE TO RELATED APPLICATIONS

This application claims the priority of ES P201330655 filed May 6, 2013, which is incorporated by reference herein.

TECHNICAL FIELD

The present invention relates to a stopping system for the cab of boarding bridges for accessing aircrafts and ships, especially to boarding bridges having a round structure to which the cab is attached with rotational capabilities and which comprises braking means to halt the rotation of the cab, as well as an operating sensor for the actuating mechanism of the cab, the braking means may be activated by the operating sensor, when the latter detects the breakdown or failure of the actuating system of the cab.

The system of the invention is intended for detecting the breakdown or failure of the actuating system, and activating the halting or stopping system of the cab if the situation arises, this activation may be integrally mechanical, hydraulic or electromagnetic.

BACKGROUND OF THE INVENTION

The cab of a boarding bridge for accessing aircraft and ships, which is the part of the machine directly connecting with the aircraft or ship, is attached to the round structure at the central points of the same, both on its upper side (roof) and lower side (floor). This round structure has a circular shape acting as a guide, which aids the cabin to follow said shape during its rotational movement around the aforementioned central points.

Said rotational movement is possible thanks to a system of independent rollers, which are joined to the cab and rest on the circular structure of the floor of the round structure, easing the movement of the cab around it.

Finally, the activation of the described system may be carried out by electrical, mechanical or hydraulic means, being possible to provide the cab with an angular speed following the circular shape of the round structure.

One of the most severe problems which may occur in the described system, may arise if there is a failure in the activating system, in which case, the cab would be completely loose, rotating uncontrollably and being possible for it to impact the fuselage of an aircraft or ship in the vicinity of the cab, or even injuring the operator and users that might be on the boarding bridge in that moment.

There are currently no known systems capable of avoiding this drawback, although the are actuations focused on increasing security in case of breakdown of the actuating means, for example, oversizing those elements susceptible of failure.

Although it is true that these systems reduce the risk of accident, they cannot solve the described problem, as well as a deficient maintenance of the system may reduce considerably or even eliminate the increased security introduced by said designs.

Other designs are known, which being capable of detecting failures of the activating system, use a commercial electromagnetic brake, which coupled to the cab, tries to stop the uncontrolled rotation of the same in case of failure, activating two brake linings of a material made of a ceramic material on the circular rail, acting as a guide in the floor of the round structure. However, this system presents severe drawbacks, as the brake must be of large size, along with the increase of weight and difficult assembly it entails. Furthermore, severe fitting problems with the brake linings have been detected, which requires considerable maintenance as well as an exhaustive control of the system to assure its proper operation, including continuous cleaning of the sliding rail of the brake linings.

It has been shown that the operation of the cabin itself hinders the action of the brake linings as grease is deposited on the rail on which these have to act, decreasing considerably their efficiency, even not being capable of braking the cab.

DESCRIPTION OF THE INVENTION

The subject matter of the present invention is to eliminate the problems set forth above, by means of a system that, by detecting the breakdown or failure of the cab rotation actuating mechanism of a boarding bridge, activates a system for halting or stopping the cab.

The subject matter of the invention is a stopping system capable of blocking or stopping the rotation of the cab by detecting the breakdown or failure of the actuating system of said cab, by means of the corresponding operating sensor.

In accordance with the invention, and according to a preferred embodiment, the rotation of the cab is stopped by means of a cab rotation blocking mechanism, the mechanism of which is made up of a linearly movable lance, which is attached to the frame that supports the cab, and of a coupling part for said lance that is integral to and rotates with the cab.

The lance is aligned with the coupling part and to it are associated retention means, which are capable of keeping said lance in an inactive position, separated from the coupling part.

The lance is also associated with pushing means, in change of propelling said lance toward an active position, in which it fits into the coupling part, blocking it and stopping its rotation.

The aforementioned retention means may be loosened through the operating sensor, when said sensor detects a failure or breakdown of the cab actuating system. In this circumstance, when loosened by the retention means, the lance is moved by the actuation of the pushing means, until reaching its active position, in which it fits into the coupling part and blocks and stops the rotation of the cab.

According to one possible embodiment, the coupling part consists of a cogwheel that is integral to a rotation shaft of the cab. The lance faces the teething thereof radially, which lance bears on its inner end, facing the cogwheel, a tip which is shaped so as to be able to couple between two consecutive teeth of the cogwheel, when said lance is moved into the active position.

The lance is to be attached to a structure that is integral to the round structure, though a bushing that will allow said lance to move between its inactive and active positions.

The lance retention means may consist of a wire that is fixed by one end to the lance, and by the opposite end to the cab actuating mechanism. The wire is to be tense so as to keep the lance it its inactive position. In this case, this same wire may act as an operating sensor, if it loses tension due to the breakdown or failure of the cab actuating mechanism.

The pushing means in charge of impelling the lance toward the active position may be constituted by a spring that is assembled around the lance, in its compressed state, between a butt that is integral to said lance, near its inner end, and the structure that supports the lance.

In a normal operating position, with the lance in its inactive position, the spring shall be in its compressed state, between the aforementioned butt of the lance and the structure that supports said lance.

Should the actuating mechanism of said cab breakdown, the cable that acts as a lance retention means loses its tension and, by the effect of the tension of the spring which makes up the pushing means, said lance is moved towards the active position, in which its inner end fits between two consecutive teeth of the cogwheel, blocking and stopping the rotation of the cab.

There may also be means associated to the lance, which prevent it from backing out of the active position. These means may consist of a depression or recess in the lateral surface of said lance, and in a pin that rests perpendicularly against the lance and is impelled towards the same. The depression is positioned on the lance in such a way that it faces the pin in the active position of said lance, so as to admit its end, acting as a stop, which prevents the lance from moving backwards.

The movement of the lance between its inactive and active positions may be brought about by means different from those described, for example by means of electromechanical or hydraulic systems which, as they are connected to the lance, impel it in the appropriate direction in order to make it fit into the coupling part and thereby block and stop the cab.

Likewise, the cab actuation failure detection means may consist of electrical, hydraulic or electromagnetic systems, and the like.

As systems for detecting the breakdown of the cab actuating mechanism, sensors or angular speed control systems may be employed, which will activate hydraulic or electromagnetic elements connected to the lance, for the purpose of moving it from its inactive position into the active position, in order to block and stop the cab.

The means for preventing the lance from backing out of the active position may also serve to prevent the lance from rotating. To this end, the depression in the lance, which faces the pin and shall serve as a means of preventing said lance from moving backward, may be configured such that in the inactive position of the lance, the pin rests against the flat surface of the same, preventing it from rotating.

DETAILED DESCRIPTION OF ONE EMBODIMENT

The constitution, characteristics and advantages of the stopping system of the invention will be better understood with the following description referred to the exemplary embodiment shown in the accompanying drawings.

Figure 1:
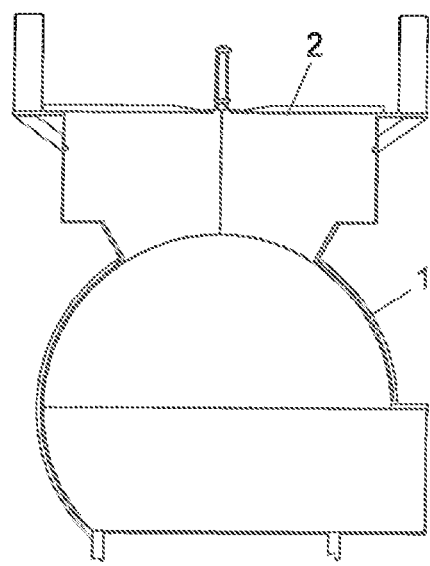
FIG. 1 shows a plan view from above of the round structure and cab of a boarding bridge.

As seen in FIG. 1, a boarding bridge finishes as a round structure (1) on which a cab (2) is mounted, which rotates with respect to the round structure (1). Actuating the cab (2) may be carried out by means of a drive system, for example by means of a chain (3) housed in a circular channel (4) which skirts the lower portion of the round structure (1). The chain (3) or drive system of the cab is associated to a tensor (5) with which an operating sensor of the drive system (3) will relate, which may consist of a tensor wire (6).

Figure 3:
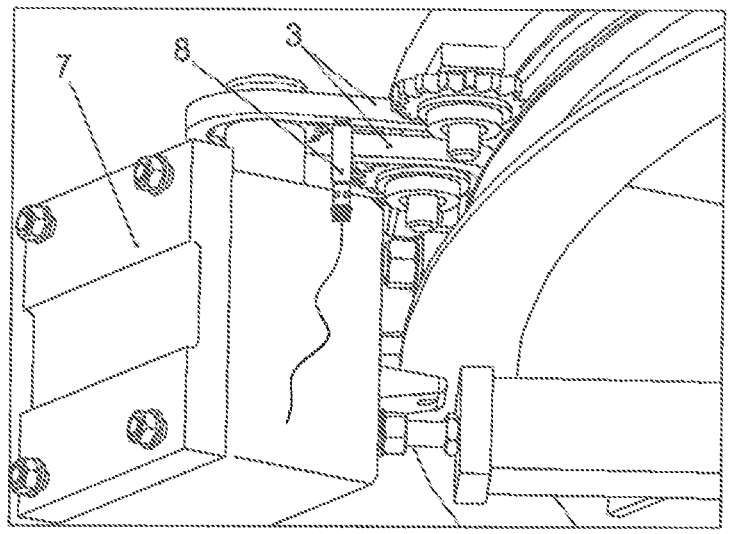
FIG. 3 shows a perspective view of part of the cab actuating mechanism.

The actuating system (7), in charge of actuating the chain (3) or the drive system. (2) of the cab, along with a sensor (8) for detecting the breakdown of the actuating system (7), is shown in FIG. 3.

Figure 4:
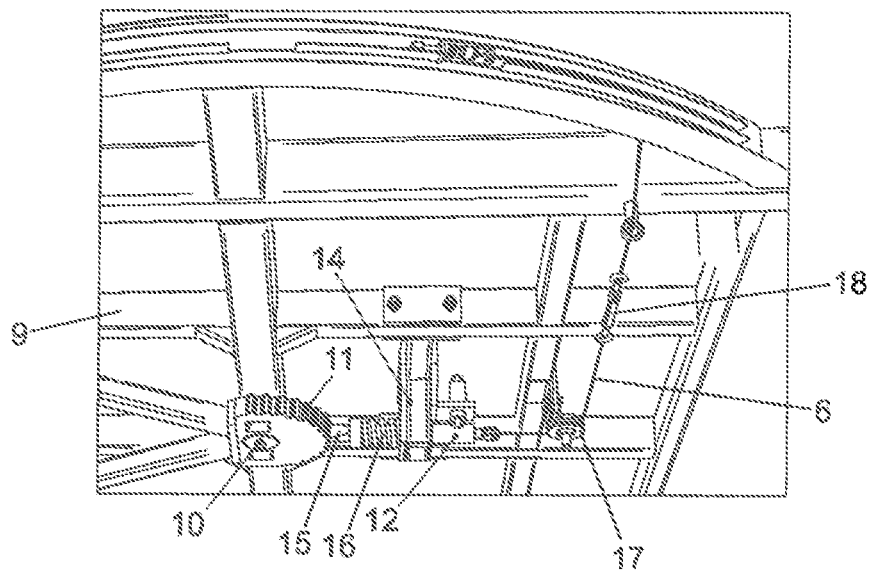
FIG. 4 is a perspective view from below of the structure of the round structure with the cab braking means.

The lower structure (9) of the round structure (1), on which the cab (2) is mounted through a rotation shaft (10), is displayed in FIG. 4.

The cab (2) includes braking means made up of a rotation blocking and halting mechanism of the cab. This mechanism is made up, in the example depicted in the drawings, of a cogwheel (11), FIGS. 4, 5 and 6, which is integral to the rotation shaft (10) of the cab (2). This cogwheel (11) is faced by a linearly movable lance (12) which bears on its inner end, facing the cogwheel (11), a tip (13) which is shaped so as to be able to couple between two consecutive teeth of the cogwheel. The lance (12) is attached to the wire (6) on its outer end. The cogwheel (11) may be disposed immediately above the roof or immediately below the floor of the cab (2).

The lance (12) is attached to a structure (14) which is integral to the frame (9) of the round structure through a bushing or fitting which enables and drives the linear movement of the lance (12), as will be described below.

Next to the tip (13), the lance (12) has a butt (15) between which and the structure (14) a compression spring (16) is mounted.

The wire (6) will be guided by pulleys (17) and may include a tensor (18).

In normal operational conditions, by means of the tension of the wire (6), the lance (12) is displayed in an inactive position, in which the tip (13) is separated from the cogwheel (11), not being introduced between the teeth of the same, thus enabling the free rotation of the cogwheel and therefore the shaft (10) and cab (2) with respect to the round structure (1).

In case of breakdown of the activating mechanism of the cab (2), the wire (6) gets untensioned, being the lance (12) thus moved towards an active position, by means of the spring (16), in which the tip (13) engages between two teeth of the cogwheel (11), thus blocking the rotation of said cogwheel and thus the shaft (10) and cab (2).

Figure 5:
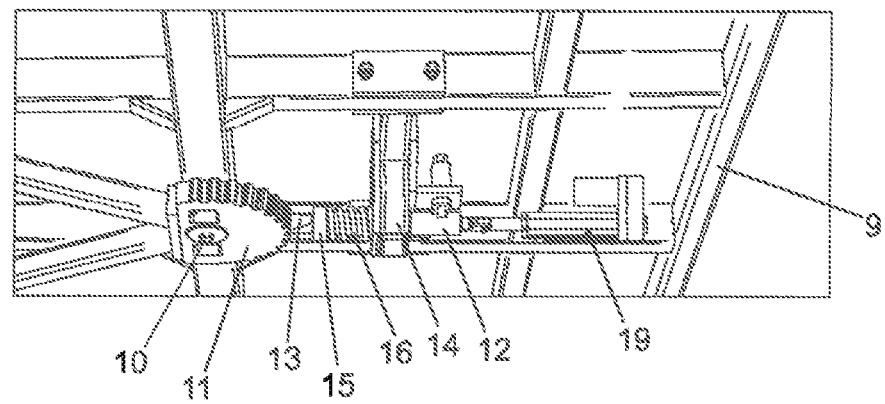
FIG. 5 is a similar view to FIG. 4, showing a variant embodiment within the cab breaking means.

As depicted in FIG. 5, the inactive position of the lance (12) may be achieved by means of an electrical, hydraulic or electromechanical actuator (19) which is mounted on the frame (9) of the round structure and which may be activated by the sensor (8), FIG. 3, capable of detecting the breakdown of the actuating mechanism (7), in order to release the lance (12) and achieving its movement towards the active position in which the tip (13) gets engaged between two teeth of the cogwheel (11) for blocking the same.

Figure 7:
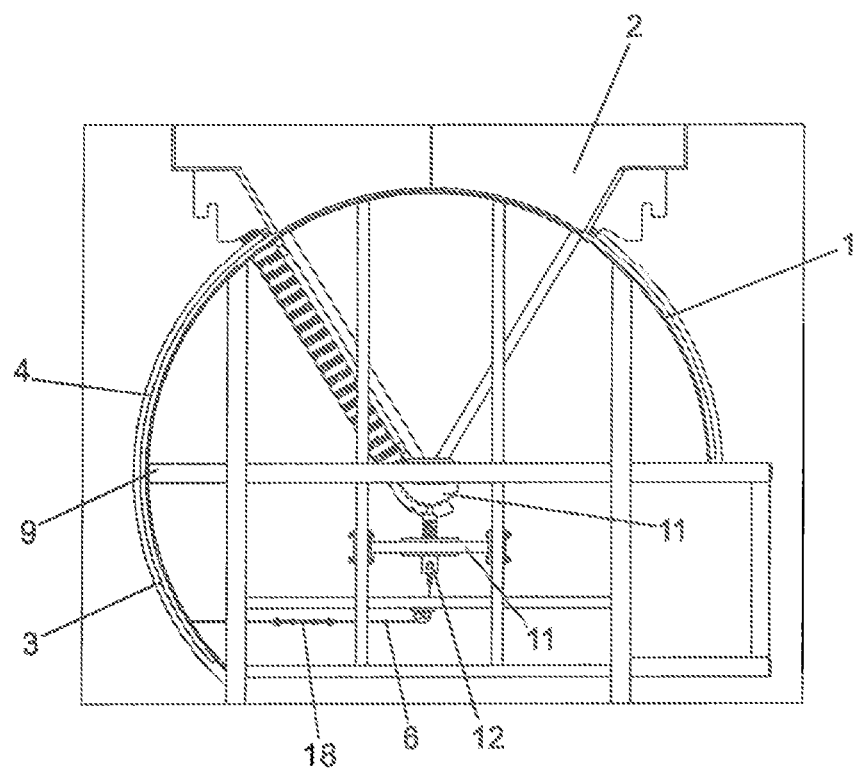
FIG. 7 shows a plan view from below of the set of cab breaking means.

In FIG. 7, from a bottom view, it is displayed the relative position of the different parts of the blocking mechanism which constitutes the stopping system of the invention.

Figure 2:
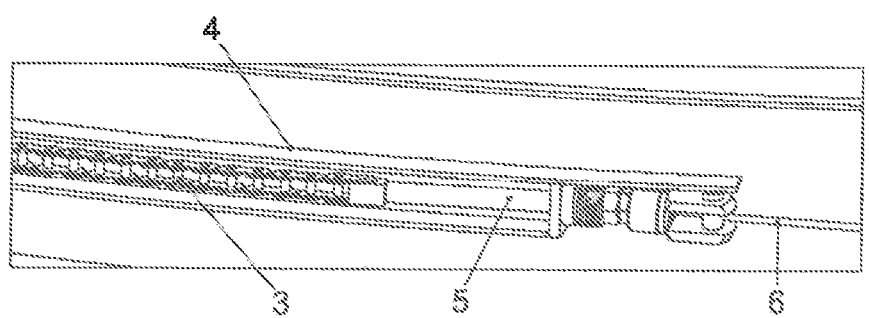
FIG. 2 shows a perspective view of one possible system for actuating the cab of the boarding bridge.
Figure 6:
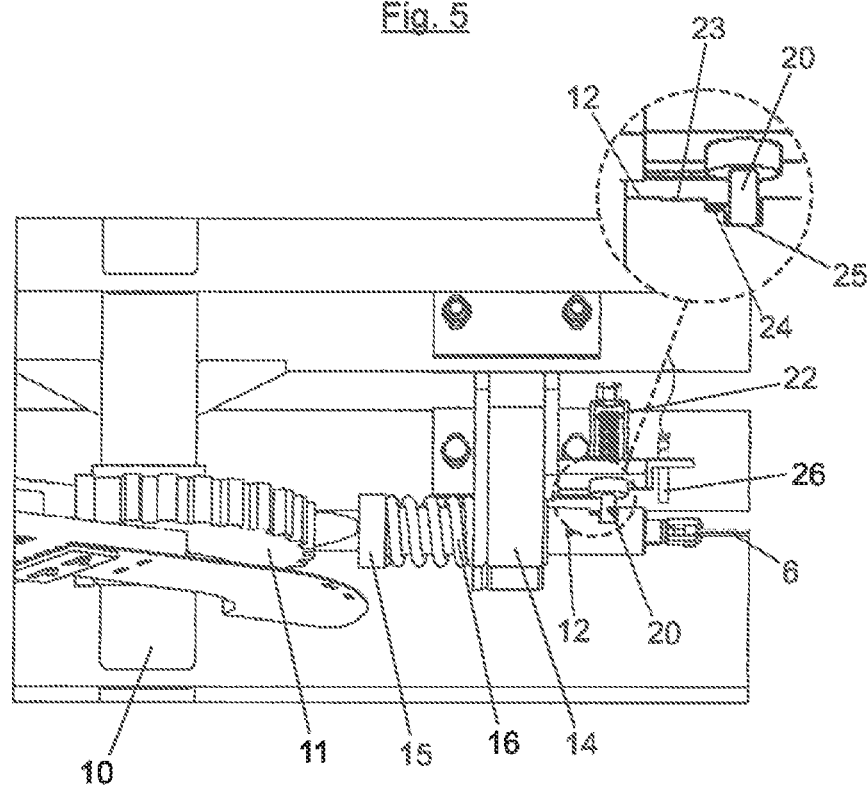
FIG. 6 is a similar view to FIG. 5, showing one possible embodiment of the safety system of the cab breaking means.

In the embodiment of FIGS. 4 and 6, the wire (6) which serves as retention means of said lance in its inactive position, may also act as breakdown sensor of the chain (3), FIG. 2, or as actuating system of the cab (2). The release of the lance (12) may also be achieved by means of a sensor (8), FIG. 3, which detects the failure or breakdown of the actuating mechanism (7).

The structure (14), FIG. 6, Which holds the lance (12), may be joined either permanently or removably to the frame (9) of the round structure (1). The removable fixing system of this structure (14) may allow the adjustment of the distance between the lance (12) and the cogwheel (11) thus allowing mounting conditions suitable for the correct operation of the system.

During the normal operation of the cab, while there is no breakdown of the actuating and drive system, the spring (16) will be compressed by means of the traction of the wire (6), previously tensed by means of the corresponding tensor (18), FIG. 4. This wire (6) relates the lance (13) to the actuating system (3) of the cab, FIG. 2. As the wire (6) is tensed, it is possible to maintain a determined distance between the tip (13) of the lance (12) and the cogwheel (11), enabling the rotation of said cogwheel and thus of the cab (2). The same effect may be achieved by means of the electrical, hydraulic or electromechanical actuator (19), FIG. 5, in charge of maintaining the lance (12) on its inactive position.

In the lower side of the lance (12), there are arranged means for avoiding the rotation of said lance, as well as preventing it from backing out from its active position. These means include, FIG. 6, a vertical pin (20) which is guided through a fitting (21) and which is pushed towards the lance (12) by means of gravity and a spring (22) mounted inside the fitting (21). The lance (12) on its part presents, as may better observed in the detail of FIG. 6, a flat beveled portion (23) followed by a cavity which presents two different steps or sections (24 and 25). The beveled portion (23) is placed under the pin (20) when the lance (12) is on its inactive position, serving as means for preventing the lance from backing out, which may happen as a consequence of the vibration induced by the movements of the boarding bridge of the park. This way, the engagement or fitting of the tip (13) of the lance (12) between two consecutive teeth of the cogwheel (11) is assured in case of breakdown of the drive system of the cab (2).

Should the chain or drive system (3) breakdown, FIG. 2, the wire (6) which was tensioned and attached to the chain tensor (5) gets loose, in which moment the spring (16) is decompressed propelling the lance (12) at a high speed towards the cogwheel (11). In a first moment, it may happen, depending on the position the cabin has when the chain breaks down, an initial contact between the tip (13) of the lance (12) and the extreme of the teeth of the cogwheel (11), thus these two components not meshing. Due to this, the impact strength may achieve retracting the lance (12). However, in this situation, the lance has moved to a determined distance, enough for the pin (20) to fall and rest on the upper step (24), thus preventing the lance from backing out.

In a subsequent state to that which is described above, following the impact between the lance and the outer part of the cogwheel (11), the spring (16) is still capable of expanding, whereas the cabin will continue to rotate until the corresponding opening of the cogwheel (11) matches up with the tip (13) of the lance. At this point, the spring (16) shall go over the final distance in order to move the lance (12) up to the active position, wherein the end (13) is inserted between two consecutive teeth of the wheel (11). In this position, the lance (12) will have gone over the distance corresponding to being fully engaged, up to its active position, the first step (24) having moved in the same direction, the length of which shall correspond to that of this last movement, such that in the lance's (12) active position, that of total engagement with the cogwheel (11), the pin (20) shall fall to the deeper step (25), wherein the lance (12) shall be prevented from moving backwards.

The aforementioned operating process will occur as long as there is no perfect immediate engagement between the lance (12) and the cogwheel 11). Should the engagement be immediate, the pin (20) will perform the explained movements, but without previously stopping at the step (24).

The described stopping system will act with enough speed to halt the cab almost immediately, should the actuating mechanism breakdown, thus preventing it from gaining the corresponding inertia caused by its circular movement.

The frame (9) together with the described blocking mechanism may be assembled independently of the rest of the components, and then be placed afterwards in its final position, carrying out the final connection and adjustment of the tensed wire (6), to compress the spring (16) which activates the movement of the lance (12). In those variations wherein the tensor cable (6) is not employed, the actuation breakdown detection sensors (8) FIG. 3, shall activate the lance movement system (12), which may be a hydraulic or electromagnetic actuator (19), or similar, firmly fixed to the round structure and joined to the outer end of the lance (12), shall impel the same towards the cogwheel (11).

In these cases, it shall be possible to do without the spring (16), such that the movement of the lance (12) depends upon the actuator.

Likewise, in other cases which similarly do not have a wire (6), the spring (16) shall still be needed, as the function of the actuators (19) shall be that of maintaining the distance between the lance (12) and the cogwheel (11), by compressing the spring (16) during the normal movement of the cab (2), in such a way that should a breakdown occur, the actuator shall cease to retain the lance (12) and the energy accumulated in the spring (16) shall activate the movement of the same. In the latter cases, the compression of the spring (16) by the actuator until reaching the fixing position shall be carried out by auxiliary means.

It should be borne in mind that there may be other alternatives in which the lance (12) and the cogwheel (11) have different geometries, which contain surfaces and/or shapes, be they complex or plain, making it possible to halt the cab (2). Moreover, the contact area between the parts in not restricted to that which is indicated in the drawings, as the wheel (11) may also be embodied with other surfaces.

Coverings or coatings of materials suitable for these parts, which accentuate their provided admission properties, are likewise not to be excluded. It should also be borne in mind that the invention may be installed in telescopic bridges for boarding aircraft and ships that are already in use and, of course, in newly manufactured hoarding bridges.

The invention claimed is:

1. A braking system for a cab of a boarding bridge configured for accessing aircraft and ships, the boarding bridge comprising a round structure to which the cab is rotatably attached, the braking system having braking means configured to halt rotation of the cab, and also having an operating sensor, wherein the braking means are activated by the operating sensor when the operating sensor detects a failure of the drive system of the cab, the braking means comprising a cab rotation blocking mechanism comprising a linearly movable lance which is attached to a frame that supports the round structure, and further comprising a coupling part, shaped to engage the lance and that is integral to and rotates with the cab;

wherein the lance is aligned with the coupling part, and wherein the breaking means further comprise retention means, the retention means being capable of keeping said lance in an inactive position separated from the coupling part, and wherein the breaking means further comprise pushing means, the pushing means being capable of propelling said lance toward the active position in which said lance fits into the coupling part and thereby engages the coupling part and blocks rotation of the cab;

wherein the retention means is released when the operating sensor detects a failure of the cab drive system, so as to allow the lance to be propelled to its active position by the pushing means.

2. The system according to claim 1, wherein the coupling part comprises a cogwheel integral to a rotation shaft of the cab, whose teething faces radially opposite the lance.

3. The system according to claim 2, wherein the retention means comprises a wire, the wire being fixed to both an end of the lance and to the drive mechanism of the cab.

4. The system according to claim 1, wherein the lance comprises a beveled portion with a flat surface,
wherein the breaking means further comprises a pin, the pin being movable into said beveled portion of the lance for preventing the lance from at least one of rotating and backing up.

5. The system according to claim 4,
wherein said pin is perpendicular to the lance and is biased towards the lance; and
wherein said pin prevents the lance from at least one of backing up and rotating when the pin is positioned against the flat surface of the beveled portion.

6. The system according to claim 4, wherein the beveled portion of the lance comprises a deep section and an intermediate section, the deep section being deeper than the intermediate section;
wherein the pin engages the deep section when the lance is in the active position; and
wherein the pin engages the intermediate section when the lance is in an intermediate position between the active position and the inactive position.

7. The system according to claim 1, wherein the pushing means comprises a spring that is mounted around the lance in a compressed state, the spring being positioned between a butt which is integral to the lance and a structure supporting the lance.

8. The system according to claim 1,
wherein the coupling part comprises a cogwheel, and
wherein an end of the lance faces the cogwheel and is sized to fit between teeth of the cogwheel.

9. The system according to claim 1, wherein the lance is attached to a structure integral to the frame of the round structure by a guide structure, the guide structure being configured to allow linear movement of the lance.

10. The system according to claim 1, wherein the retention means is connected to an end of the lance.

11. The system according to claim 1, wherein the retention means comprises an actuator joined to an outer end of said lance.

12. The system according to claim 1, wherein the breaking means comprises an activation detector configured to transmit a location to a control system of the boarding bridge.

13. A braking arrangement for a cab of a boarding bridge, the boarding bridge comprising a rotatable cab and a round structure:
wherein the braking arrangement is configured to halt rotation of the cab;
wherein the braking arrangement comprises:
an operating sensor configured to detect failure of a drive system of the cab;
a linearly movable lance, the lance comprising a tip and being movably connected to the round structure of the boarding bridge;
a coupling part, the coupling part being attached to and rotating with the cab, and being configured to receive the tip of the lance when the lance is in an active position and thereby preventing rotation of the cab;
a retention mechanism, the retention mechanism being capable of holding the lance in an inactive position wherein the lance is separated from the coupling part, wherein the breaking arrangement does not prevent rotation of the cab in the inactive position;
a pushing mechanism, the pushing mechanism being configured to propel the lance toward the coupling part and thereby into said active position; and
the arrangement being configured wherein when the sensor detects a failure of the drive system of the cab, the retention mechanism releases the lance, and the pushing means propels the lance to the active position where it is engaged to the coupling part and the cab is thereby prevented from rotating.

14. The braking arrangement according to claim 13:
wherein the retention mechanism comprises a wire fixed to the lance;
wherein the wire is also configured as the operating sensor, the wire being configured to be tense in the inactive position, and to lose tension in response to a failure of the drive system of the cab and thereby allow movement of the lance into the active position.

15. The braking arrangement according to claim 13:
wherein the retention mechanism comprises a wire.

16. The braking arrangement according to claim 13:
wherein the coupling part comprises a cog wheel.

17. The braking arrangement according to claim 13:
wherein the pushing mechanism comprises a spring.

18. The braking arrangement according to claim 13:
wherein the pushing mechanism comprises at least one of a hydraulic system, an electromechanical system, and an electromagnetic system.

19. The braking arrangement according to claim 13:
wherein the lance comprises a beveled portion,
wherein the breaking arrangement further comprises a pin, the pin being movable into said beveled portion of the lance.

20. The braking arrangement according to claim 13:
wherein the retention mechanism comprises a wire;
wherein the operating sensor also comprises said wire;
wherein the coupling part comprises a cog wheel; and
wherein the pushing mechanism comprises a spring.

* * * * *